(12) United States Patent
Ma et al.

(10) Patent No.: US 9,033,117 B2
(45) Date of Patent: May 19, 2015

(54) MOTOR AND ELECTRIC PARKING BRAKE SYSTEM

(75) Inventors: Hang Cheong Ma, Hong Kong (CN);
Hing Shing Chung, Hong Kong (CN);
Hai Ning Liao, Shenzhen (CN)

(73) Assignee: Johnson Electric S.A., Murten (CH)

( * ) Notice: Subject to any disclaimer, the term of this patent is extended or adjusted under 35 U.S.C. 154(b) by 270 days.

(21) Appl. No.: 12/948,510

(22) Filed: Nov. 17, 2010

(65) Prior Publication Data

US 2011/0147144 A1    Jun. 23, 2011

(30) Foreign Application Priority Data

Nov. 17, 2009    (CN) .......................... 2009 1 0109741

(51) Int. Cl.
*B60T 13/74* (2006.01)
*H02K 3/28* (2006.01)
*H02K 23/26* (2006.01)

(52) U.S. Cl.
CPC ................ *B60T 13/741* (2013.01); *H02K 3/28* (2013.01); *H02K 23/26* (2013.01); *H02K 2201/06* (2013.01)

(58) Field of Classification Search
USPC ................................... 188/162; 320/198, 184, 320/216.019–216.094; 310/198, 184, 310/216.019–216.094, 131, 180, 185
See application file for complete search history.

(56) References Cited

U.S. PATENT DOCUMENTS

| | | | | |
|---|---|---|---|---|
| 519,098 A * | 5/1894 | Schmid et al. | ................ | 310/131 |
| 525,447 A * | 9/1894 | Dahl | .............. | 318/719 |
| 4,280,072 A * | 7/1981 | Gotou et al. | ................ | 310/67 R |
| 4,672,253 A * | 6/1987 | Tajima et al. | ................ | 310/269 |
| 4,900,963 A * | 2/1990 | Amano et al. | ................ | 310/187 |
| 5,172,870 A | 12/1992 | Van Assema | | |
| 5,348,123 A * | 9/1994 | Takahashi et al. | ........... | 188/72.1 |
| 5,661,355 A * | 8/1997 | Darceot | ........................ | 310/180 |
| 6,376,963 B1 | 4/2002 | Furuya et al. | | |
| 6,568,066 B2 | 5/2003 | Furuya et al. | | |
| 8,350,420 B2 | 1/2013 | Kimura et al. | | |
| 2005/0184612 A1* | 8/2005 | Cros et al. | ..................... | 310/158 |
| 2006/0113420 A1 | 6/2006 | Nomura | | |
| 2008/0106144 A1 | 5/2008 | Schrader | | |
| 2008/0314700 A1* | 12/2008 | Cho | .............................. | 188/162 |
| 2011/0050025 A1* | 3/2011 | Doushita et al. | .............. | 310/198 |
| 2011/0062697 A1 | 3/2011 | Kimura et al. | | |
| 2011/0147144 A1 | 6/2011 | Ma et al. | | |

FOREIGN PATENT DOCUMENTS

| | | |
|---|---|---|
| CN | 200942768 Y | 9/2007 |
| EP | 2 246 225 A1 | 11/2010 |
| JP | H 066943 A | 1/1994 |
| JP | H 11178301 A | 7/1999 |
| JP | 2000295798 A | 10/2000 |
| JP | 2001095219 A | 4/2001 |
| JP | 2004169731 A1 | 6/2004 |
| JP | 2008531930 A | 8/2008 |
| JP | 2008301597 A | 12/2008 |

* cited by examiner

*Primary Examiner* — Anna Momper
*Assistant Examiner* — San Aung
(74) *Attorney, Agent, or Firm* — Muncy, Geissler, Olds & Lowe, P.C.

(57) ABSTRACT

A motor for actuating brake members of an electric parking (EPB) system, includes a stator and a rotor rotatably mounted to the stator. The rotor has a shaft, a commutator, a rotor core fixed to the shaft, and rotor windings wound about teeth of the rotor core and electrically connected to segments of the commutator. The rotor windings have a plurality of winding units and each of the winding units have at least two coils. The coils of each winding unit are wound about the same teeth and are connected to a same pair of segments.

16 Claims, 4 Drawing Sheets

MOTOR AND ELECTRIC PARKING BRAKE SYSTEM

CROSS REFERENCE TO RELATED APPLICATIONS

This non-provisional patent application claims priority under 35 U.S.C. §119(a) from Patent Application No. 200910109741.2 filed in The People's Republic of China on Nov. 17, 2009, the entire contents of which are fully incorporated herein by reference.

FIELD OF THE INVENTION

This invention relates to an electric parking brake system and to a DC motor for an electric parking brake system.

BACKGROUND OF THE INVENTION

Service brake systems and parking brake systems are two kinds of brake systems widely used in vehicles. A service brake system is a braking system used to slow or stop a moving vehicle, while a parking brake system is used to prevent a stationary vehicle from moving or rolling away. Traditional parking brake systems were manually hand operated and are also called 'handbrakes'. A driver needed to pull up the handbrake manually to prevent a stationary vehicle from rolling away and needed to manually release the handbrake to allow the vehicle to move.

Electric parking brake (also called EPB) systems were developed to replace the traditional handbrake systems. When a vehicle is stationary, an EPB system will automatically lock the wheels to prevent the vehicle from rolling. When a driver tries to get a stationary vehicle to move, the EPB system will unlock the wheel automatically. The EPB system comprises brake components, such as calipers and brake pads, to frictionally lock the wheels and an electric motor to actuate the calipers. FIG. 5 illustrates a winding scheme of a traditional permanent magnet direct current (PMDC) motor used in an EPB system. The rotor windings comprise a plurality of coils wound about teeth of the rotor core and electrically connected to segments of a commutator. For example, coil C31 is wound about teeth T1 and T2 and connected to segments S1 and S2. Coil C32 is wound about teeth T2 and T3 and connected to segments S2 and S3. The PMDC motor comprises two brushes to feed current to the rotor windings. The rotor windings form two parallel branches. When a coil such as coil C31 is open, one of the branches will be open. The motor as well as the EPB system will malfunction. It is dangerous to drive a car having a malfunctioning EPB system.

Therefore, there is a desire for an EPB system with an improved reliability.

SUMMARY OF THE INVENTION

Accordingly, in one aspect thereof, the present invention provides a motor for actuating brake members of an electric parking system, comprising a stator and a rotor rotatably mounted to the stator; the rotor comprising a shaft, a commutator and a rotor core fixed to the shaft, and rotor windings wound about teeth of the rotor core and electrically connected to segments of the commutator; wherein the rotor windings comprises a plurality of winding units, each of the winding units comprising at least two coils, the coils of each winding unit being wound about the same teeth and connected to a same pair of segments.

Preferably, each winding unit comprises two coils, one of the two coils being arranged in an inner layer, the other one of the two coils being arranged in an outer layer.

Preferably, the rotor windings are formed by one continuous wire.

Preferably, some the inner layer coils and some of the outer layer coils are formed by one continuous wire, and the remaining inner layer coils and the remaining outer layer coils are formed by another continuous wire.

Preferably, a part of the rotor windings are received in winding slots formed between adjacent teeth, and the winding slots are inclined with respect to an axial direction of the rotor.

Preferably, at least one dummy slot is formed in a circumferential surface of each tooth of the rotor core.

Preferably, the rotor core comprises five teeth, and each tooth comprises two dummy slots formed in a circumferential surface of the tooth.

According to a second aspect, the present invention also provides an electric parking brake system, comprising: an electronic control unit; a motor controlled by the electronic control unit; a gearbox for reducing the output speed of the motor; and brake members driven by the gearbox for locking wheels; wherein the motor is a motor as defined above.

Preferably, the output shaft of the gearbox moves in a linear direction.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
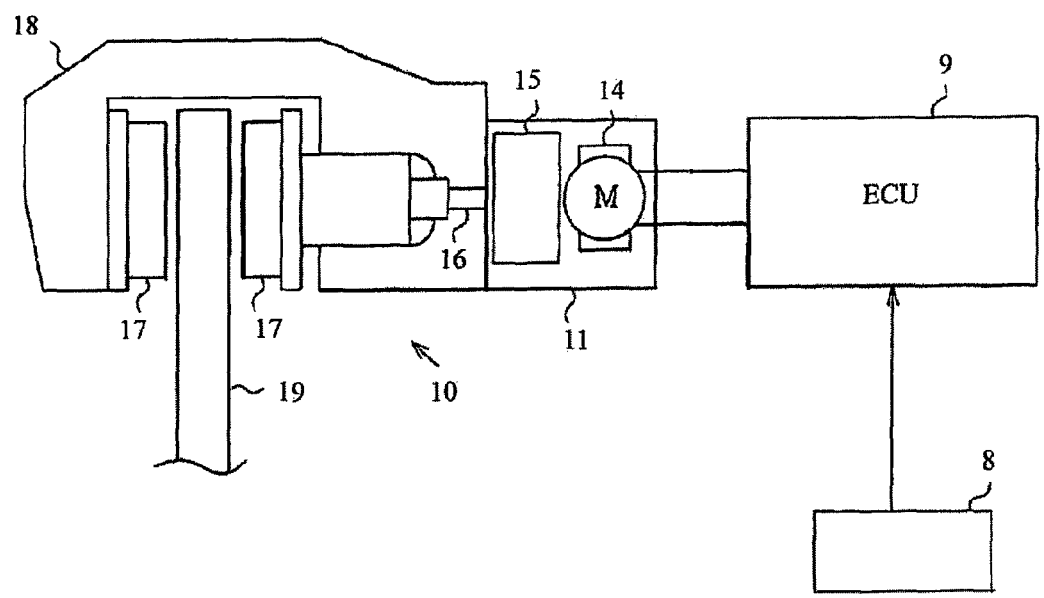
FIG. 1 is a schematic view of an EPB system according to the preferred embodiment of the present invention.

As shown in FIG. 1, an EPB system according to the preferred embodiment of the present invention comprises sensors 8, an electronic control unit (ECU) 9 and a brake section 10 controlled by the ECU 9. The sensors 8 are connected to the ECU 9 and detect movement of a vehicle and delivers a corresponding signal to the ECU 9.

The brake section 10 comprises a driving apparatus 11, braking members such as a pair of brake pads 17, driven by the driving apparatus 11 and a support member, such as a caliper 18, fixed to a non-rotating part of the vehicle. The driving apparatus 11 and the brake pads 17 are connected to the caliper 18. A brake disc or rotor 19 that spins with one of the vehicle wheels (not shown) is disposed between the pair of brake pads. The brake pads are moved by one or more pistons of the caliper to squeeze the brake disc to grip or slow the rotation of the disc which in turn holds the vehicle stationary or slows movement of the vehicle. The piston or pistons of the caliper are driven by the pressure created by brake fluid from a master cylinder. In this way, the pair of brake pads can be forced against the brake disk 19 to lock the wheel. The pair of brake pads can also be released by removing the pressure to unlock the wheel.

The driving apparatus 11 comprises a PMDC motor 14 and a reduction gearbox 15 with a linearly moving output shaft 16. The gearbox reduces output speed of the motor 14 and converts the rotary motion of the motor to linear motion. The output shaft 16 effects movement of the piston of the caliper by moving a piston in a master cylinder to pressurize the brake fluid which in turn moves the piston of the caliper. The brake fluid is actuated by the axial movement of the output shaft 16, to make the braking members 17 frictionally engage the brake disc 19, or to release the engagement. Alternatively, the output shaft may be arranged to directly drive the piston of the caliper.

The PMDC motor 14 comprises a stator and a rotor rotatably mounted to the stator. The rotor comprises a shaft, a commutator fixed to the shaft, a rotor core fixed to the shaft and rotor windings wound about teeth of the rotor core and electrically connected to segments of the commutator. The stator comprises at least two brushes in sliding contact with the commutator to feed current to the rotor windings via the commutator. The motor 14 is capable of rotating bi-directionally to engage and disengage the brakes.

Figure 2:
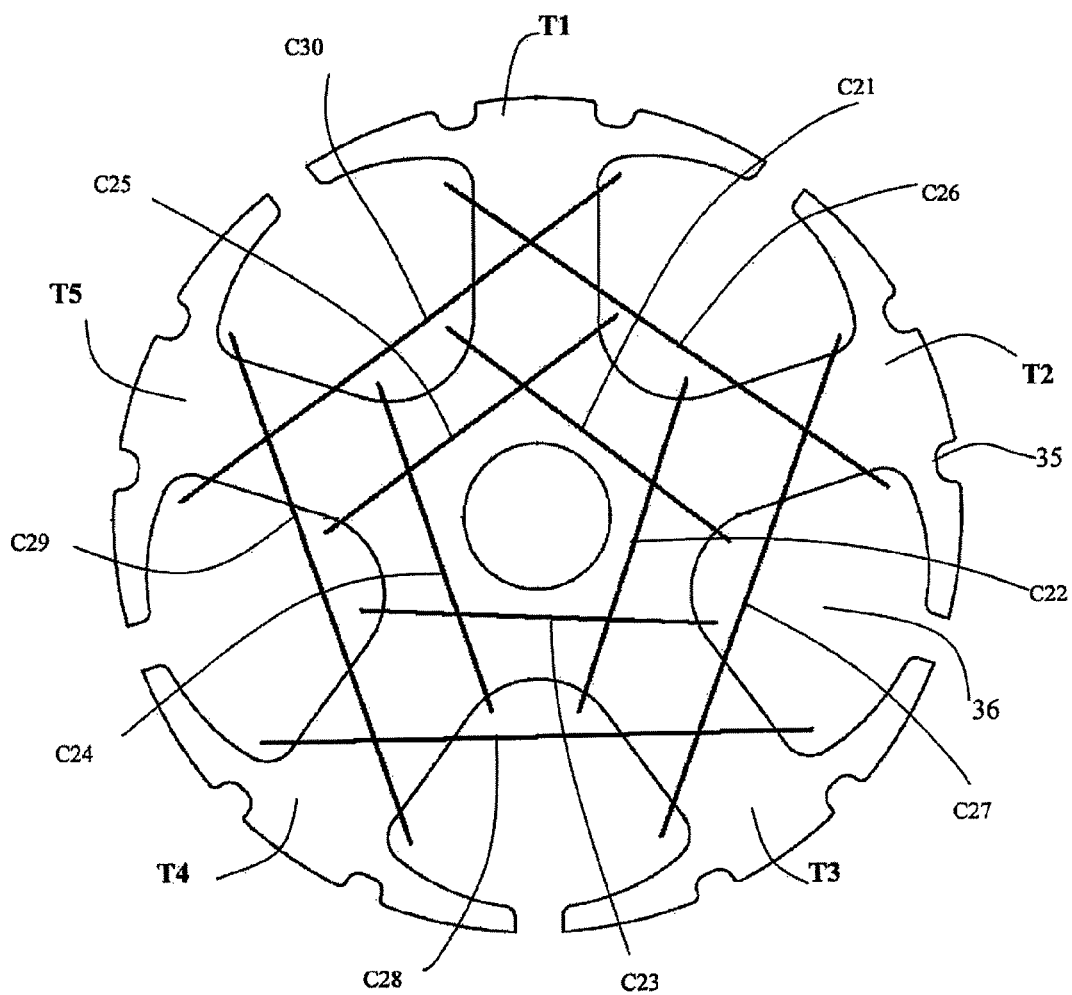
FIG. 2 illustrates a rotor core and rotor windings of a motor used in the preferred EPB system.

FIG. 2 illustrates the rotor core and the rotor windings. The rotor core comprises five teeth T1~T5. Winding slots 36 are formed by adjacent teeth and receive the rotor windings. The rotor windings comprise ten coils C21~C30. The ten coils C21~C30 form five winding units, each of which comprises two coils. A first winding unit comprises the coils C21 and C26. A second winding unit comprises the coils C22 and C27. A third winding unit comprises the coils C23 and C28. A fourth winding unit comprises the coils C24 and C29, and a fifth winding unit comprises the coils C25 and C30. Each of the coils of a winding unit is wound about the same teeth and connected to the same pair of segments.

Figure 3:
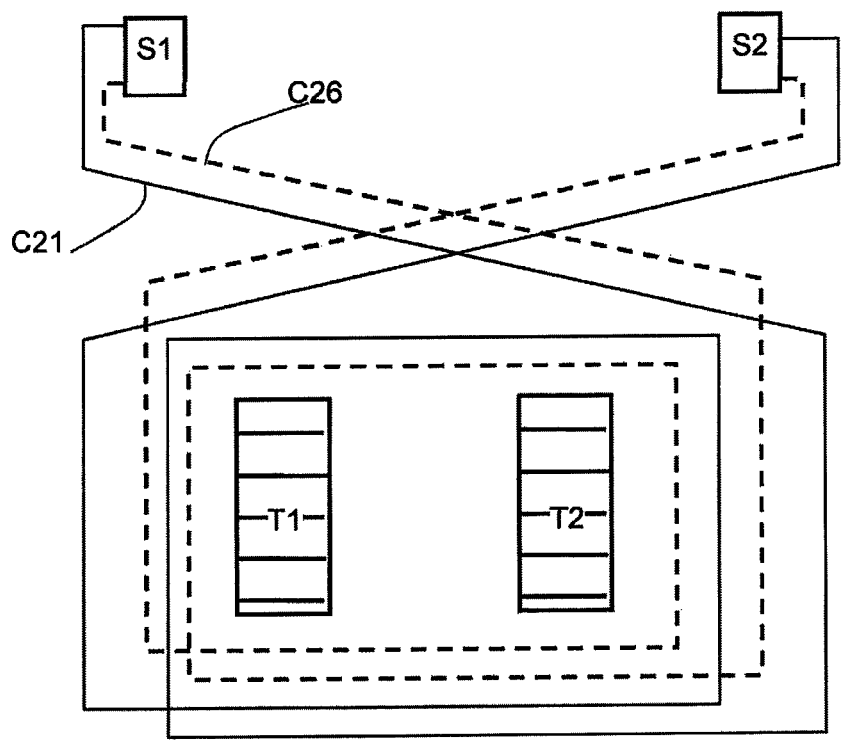
FIG. 3 illustrates a winding unit of the rotor windings of FIG. 2.

FIG. 3 illustrates the first winding unit comprising coils C21 and C26. Both of the coils C21 and C26 are wound about teeth T1 and T2 and are connected to segments S1 and S2. Therefore, the coils C21 and C26 are electrically connected in parallel. If one of the coils C21 and C26 is open circuited, the current is still conducted by the first winding unit via the other coil. Testing results are illustrated in Table 1.

TABLE 1

Testing Result of Motor Performance

| Motor Performance | | Rotation Direction | | | |
|---|---|---|---|---|---|
| | | CW | | CCW | |
| | | Speed (RPM) | Current (A) | Speed (RPM) | Current (A) |
| Free load | Open Circuit | 8,280 | 0.90 | 8,250 | 0.90 |
| | Full Function Circuit | 8,694 | 0.50 | 8,690 | 0.53 |
| On Load (195 mNm) | Open Circuit | 4,946 | 16.86 | 4,946 | 16.66 |
| | Full Function Circuit | 5,117 | 16.97 | 5,117 | 16.33 |

TABLE 1-continued

Testing Result of Motor Performance

| Motor Performance | | Torque (mNm) | Current (A) | Torque (mNm) | Current (A) |
|---|---|---|---|---|---|
| Stall | Open Circuit | 469.36 | 40.34 | 472.99 | 39.96 |
| | Full Function Circuit | 512.72 | 45.48 | 513.71 | 43.74 |

In Table 1, the term "Open Circuit" means that one coil is open circuited while the other coil is conductive, while the term "Full Function Circuit" means that both of the coils are conductive, i.e., not open circuited. As shown in Table 1, in the case of open circuit, the motor still works, with only a slight performance loss. Therefore, an EPB system using the motor is more reliable and safer compared to traditional EPB system. A coil is said to be open circuited or open when the wire forming the coil is broken such that current can not flow through the coil from one segment to the next.

In this embodiment, the rotor windings comprise inner layer windings and outer layer windings. The coils C21~C25 are arranged in the inner layer, while the coils C26~C30 are arranged in the outer layer. That is, for each winding unit, one of the two coils is disposed in the inner layer, and the other one of the two coils is disposed in the outer layer. During the winding process, the inner layer coils are wound first and then the outer layer coils are wound. Compared with the inner layer coils, the outer layer coils are further from the center of the rotor core. This reduces the likelihood that both coils of a single winding unit would be damaged at the same time as the outer layer provides physical protection for the inner layer. The rotor windings can be wound by using a single flyer winding machine. That is, the inner layer coils and the outer layer coils are wound by one continuous wire.

Alternatively, the rotor windings can be wound by using a dual flyer winding machine having two flyers which wind the windings simultaneously. That is, the inner layer coils are wound by two separate wires at the same time, and then, the outer layer coils are wound by the two wires at the same time. In other words, some of the inner layer coils and some of the outer layer coils are wound by one continuous wire. The remaining inner layer coils and the remaining outer layer coils are wound by another continuous wire. Generally, the inner layer coils and the outer layer coils wound by the same one wire are disposed opposite about the rotor shaft. Winding the rotor windings with two flyers improves the manufacturing efficiency.

In this embodiment, the number of segments is equal to the number of winding units and also equal to the number of teeth. During the winding process of the inner layer coils, the wire is attached to each segment. During the winding process of the outer layer coils, the wire is attached to the each segment again.

Further more, two dummy slots 35 are formed in the circumferential surface of each tooth of the rotor core. The dummy slots 35 extend along a direction parallel to the direction of the winding tunnels, which in FIG. 2 is parallel to the axis of the motor. The dummy slots divide the circumference surface of each tooth into three parts. Vibration and noise is reduced by the dummy slots 35.

Figure 4:
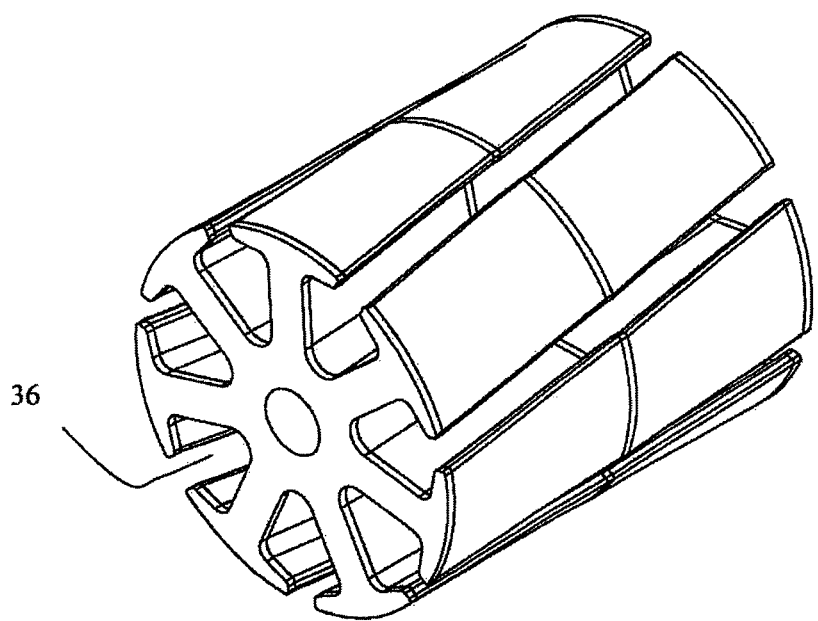
FIG. 4 illustrates a rotor core according to a second preferred embodiment of the present invention.
Figure 5:
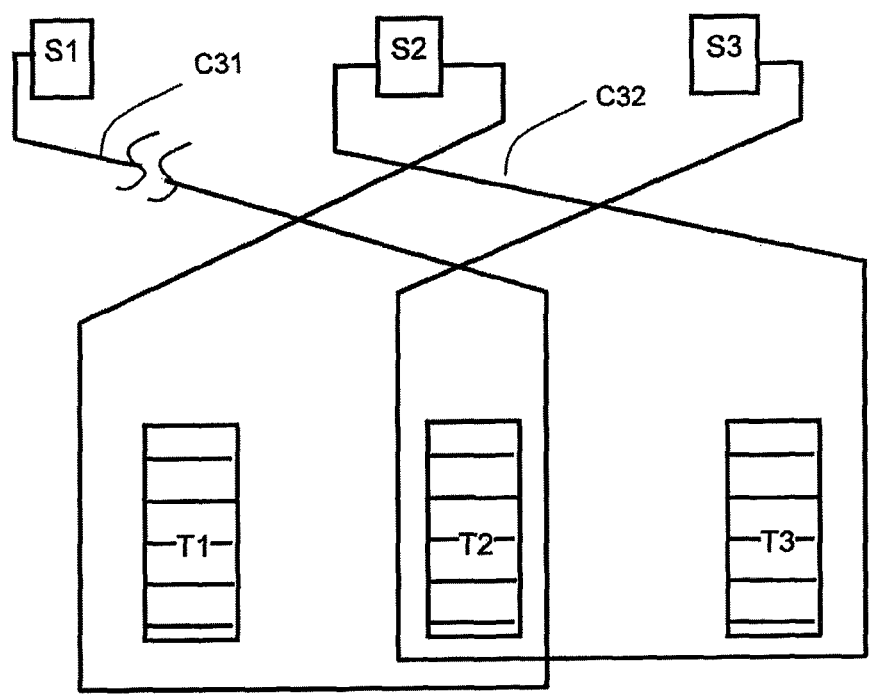
FIG. 5 illustrates rotor windings of a traditional motor used in a prior art EPB system.

FIG. 4 illustrates a rotor core according to another preferred embodiment. The rotor core comprises seven teeth and seven winding slots 36. The winding slots 36 are inclined with respect to the axis of the rotor, preferably by an angle of 10 degrees to 30 degrees, resulting in skewed rotor teeth. Vibration and noise is also reduced by the inclined winding slots 36. Dummy slots, although not used in this embodiment, may be provided in addition to the skewed rotor teeth.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor for actuating brake members of an electric parking system, comprising a stator and a rotor rotatably mounted to the stator; the rotor comprising a shaft, a commutator and a rotor core fixed to the shaft, and rotor windings wound about teeth of the rotor core and electrically connected to segments of the commutator; wherein the rotor windings comprises a plurality of winding units, each of the winding units comprising at least two coils wound about the same teeth adjacent one another and connected in parallel between a first segment and a second segment of the commutator, and in each winding unit, each coil has a first end and a second end, the first ends of the at least two coils are mechanically connected to the first segment and the second ends of the at least two coils are mechanically connected to the second segment, such that there is one winding unit connected between the first segment and the second segment, wherein at least two coils of each winding unit comprises a first coil arranged in a radially inner layer and a second coil arranged in a radially outer layer; and each two adjacent winding units both wound on a common tooth such that the common tooth is shared by the two adjacent winding units, and the first coil of each winding unit is located closer to a rotating center of the rotor core than the second coil of an adjacent winding unit.

2. The motor of claim 1, wherein the rotor windings are formed by one continuous wire.

3. The motor of claim 1, wherein some the inner layer coils and some of the outer layer coils are formed by one continuous wire, and the remaining inner layer coils and the remaining outer layer coils are formed by another continuous wire.

4. The motor of claim 1, wherein a part of the rotor windings are received in winding slots formed between adjacent teeth, and the winding slots are inclined with respect to an axial direction of the rotor.

5. The motor of claim 1, wherein at least one dummy slot is formed in a circumferential surface of each tooth of the rotor core.

6. The motor of claim 1, wherein the rotor core comprises five teeth, and each tooth comprises two dummy slots formed in a circumferential surface of the tooth.

7. An electric parking brake system, comprising:
an electronic control unit;
a motor controlled by the electronic control unit, the motor comprising a stator and a rotor rotatably mounted to the stator, the rotor comprising a shaft, a commutator fixed to the shaft, a rotor core fixed to the shaft and rotor windings wound about teeth of the rotor core and electrically connected to segments of the commutator;
a gearbox for reducing the output speed of the motor; and
brake members driven by the gearbox for locking wheels;
wherein the rotor windings comprises a plurality of winding units, each winding unit comprising at least two coils wound about the same teeth adjacent one another and connected in parallel between a first segment and a second segment of the commutator, and in each winding unit, each coil has a first end and a second end, the first ends of the at least two coils are mechanically connected to the first segment and the second ends of the at least two coils are mechanically connected to the second segment, such that there is only one winding unit connected between the first segment and the second segment, wherein at least two coils of each winding unit comprises a first coil arranged in a radially inner layer and a second coil arranged in a radially outer layer, and each of the first coils is located closer to a rotating center than each of the second coils.

8. The electric parking brake system of claim 7, wherein the rotor windings are wound by one continuous wire.

9. The electric parking brake system of claim 7, wherein a part of the inner layer coils and a part of the outer layer coils are wound by one continuous wire, and the other part of the inner layer coils and the other part of the outer layer coils are wound by another continuous wire.

10. The electric parking brake system of claim 7, wherein a part of the rotor windings are received in winding slots formed between adjacent teeth, and the winding slots are inclined with respect to an axial direction of the rotor.

11. The electric parking brake system of claim 7, wherein at least one dummy slot is formed in a circumferential surface of each tooth of the rotor core.

12. The electric parking brake system of claim 7, wherein the rotor core comprises five teeth, and each tooth comprises two dummy slots formed in a circumferential surface of the tooth.

13. The electric parking brake system of claim 7 wherein, the output shaft of the gearbox moves in a linear direction.

14. A motor for actuating brake members of an electric parking system, comprising a stator and a rotor rotatably mounted to the stator; the rotor comprising a shaft, a commutator and a rotor core fixed to the shaft, and rotor windings wound about teeth of the rotor core and electrically connected to segments of the commutator,
wherein the rotor windings comprises a plurality of winding units, each of the winding units comprising a first coil and a second coil wound about the same teeth adjacent one another and connected in parallel to a pair of segments of the commutator; and
wherein the first coils of the winding units are arranged in a radially inner layer and overlap one another, and the second coils of the winding units are arranged in a radially outer layer and overlap one another.

15. The motor of claim 14, wherein at least one dummy slot is formed in a circumferential surface of each tooth of the rotor core.

16. The motor of claim 15, wherein the rotor core comprises five teeth, and each tooth comprises two dummy slots formed in a circumferential surface of the tooth.

* * * * *